INVENTOR.
WILLIAM E. STONEY

BY Roy M. Pitts

ATTORNEY

INVENTOR.
WILLIAM E. STONEY

BY Roy M. Pitts

ATTORNEY

INVENTOR.
WILLIAM E. STONEY
BY [signature]
ATTORNEY

INVENTOR.
WILLIAM E. STONEY
BY Roy M. Pitts
ATTORNEY

INVENTOR.
WILLIAM E. STONEY
BY Roy M. Pitts
ATTORNEY 3,452,356

DIRECTIONAL RADIO RELAY SYSTEM

William E. Stoney, Whittier, Calif., assignor to North American Rockwell Corporation, a corporation of Delaware Filed June 7, 1966, Ser. No. 555,727

Int. Cl. H04b 7/14

U.S. Cl. 343—100 10 Claims

ABSTRACT OF THE DISCLOSURE

A radio data link comprising a relay having a frequency-scannable directional antenna and a plurality of radio stations each having an antenna mechanically scannable to face the relay. In an acquisition mode, a programmed sequence of carrier frequencies are transmitted from each station to the relay. When the transmitted frequency corresponds to the direction frequency of the relay, the relay transmits back a corresponding frequency signal which in turn causes the station to transmit continuously, in the data-link mode, at this direction frequency. Apparatus in the relay permits information recovered from a first station signal to modulate a carrier simultaneously being transmitted to a second radio station, thereby facilitating communication via the relay between first and second stations.

The subject invention relates to a radio communication system, and more particularly to a programmable radio communication system for providing secure high-gain communication between selected transmitting and receiving stations.

In effecting long range radio communication between two mutually spaced transmitting and receiving stations, high-gain or highly directional antennas are employed in order to increase the range or efficiency obtained from a limited source of transmitter power and a limited receiver sensitivity. Also, where a degree of security is desired, directional microwave antennas are preferred in order to restrict transmission to a limited direction or line of sight along which the intended receiver is located.

In order to effect secure radio communication between two terrestrial points which are not in a line-of-sight, due to the curvature of the earth and the distance between such points, it may be necessary to employ a relay station or reflector. A problem in the use of a directional reflector is that of maintaining the position and angular orientation thereof to provide effective, high-gain, secure communication between the two terrestrial stations between which radio communication is sought. A second problem is that of effecting concurrent or simultaneous communication between the member stations of a plurality of station pairs by means of such relay element. A prior-art scheme directed toward solving such problems is described in U.S. Patent 3,150,320, issued Sept. 22, 1964 to E. L. Gruenberg for Space Satellite Communication System Employing a Modulator-Reflector Relay Means. In such an arrangement, both a sending and receiving station of a pair of stations concomitantly transmit a carrier wave of a preselected, mutually exclusive frequency to a satellite modulator-reflector, the transmitting station's carrier being information-modulated and the receiving station's carrier being unmodulated. The satellite reflector modulator recovers the modulation envelope from a transmitting stations carrier, employing it to modulate the unmodulated carrier received from the receiving station, and re-transmits the receiving station's carrier (now modulated) back to the receiving station. By employing an array of antenna elements symmetrically disposed about a geometric center, with symmetrical pairs of antenna elements interconnected by transmission lines of equal electrical length, the reflector merely inverts the wave front of a retransmitted carrier, whereby it is directed back to the station whence it came.

A disadvantage of such an arrangement is the large amount of "on-stream" terminal equipment used in order to effect communication in either direction, the receiving station requiring to operate both a receiver and unmodulated transmitter in conjunction with the sending station's operation of a modulated transmitter, for unilateral communication. In addition, a set of channelizing filters, mixer-modulators, and power amplifiers is required onboard the satellite for each pair of antenna array elements. Where simultaneous bilateral communication is desired, each station of the station pair requires two transmitter systems and associated antennas and a receiving system and antenna, one of the transmitters providing an information-modulated envelope, while the second one provides a carrier to be modulated by the satellite (with the information to be received) and redirected back to the associated receiver system of such station. Also, a dual set of satellite channelizing mixer-modulators filters and power amplifiers is required for such bilateral communication between station pairs. In fact, if it is desired to maintain simultaneous communication between the stations of more than a single station pair it is necessary to add additional parallel networks in each transmission line onboard the satellite.

Further, because separate channelizing equipment is employed for each pair of antenna elements of the satellite antenna matrix, the effects of amplifier, or component, aging introduce phase-tracking problems which adversely effect the directional tracking properties of the modulator-reflector of the Gruenberg patent. Moreover, because the satellite will respond to any carrier frequency within the system bandwidth received from any direction within its potential beamwidth (rather than employing only a preselected frequency for an associated direction), the system of Gruenberg lends itself to jamming or the impression of an undesired modulation envelope from a spurious source upon the interrogating (unmodulated carrier) of a receiving station.

In addition, the use of a generally lineal array, rather than a planar array, of radiating elements at the satellite, provides less effective gain or directivity of the satellite system, thereby requiring very large power stages and increased apertures in the terrestrial subsystem of Gruenberg's data link system. Still further, access by any one ground station to any other than a preselected one is extremely limited in view of the preselected filter frequency pairs employed in the satellite channelizing scheme.

By means of the concept of the subject invention, the above noted disadvantages of the prior art are avoided.

In a preferred embodiment of the subject invention, there is provided a radio energy data-link comprising at least one mechanically scannable directional radio system for selectively transmitting a programmed sequence of carrier frequencies in an acquisition mode and transmitting a carrier frequency corresponding to a received frequency in a data-link mode. There is also provided a frequency-sensitive double-dispersive, directional radio system or relay for transmitting a carrier frequency corresponding to the direction and frequency of a received signal.

In normal operation of the above-described arrangement, either of the mechanically-scanned directional station or the frequency-sensitive relay station may employ a frequency-scanned transmitting program to determine the direction of each station relative to the other, the coincidence of the directivity of the mechanically scanned directional system along the line of sight to the relay and the transmission or reception by the relay station of a frequency corresponding to such line-of-sight, allows the identity of such frequency and duplicate transmission thereof by the receiving system, whereby both stations have identified that direction-frequency corresponding to such line-of-sight direction of the mechanically scanned system. In this way, a given frequency-sensitive planar array at the relay may communicate with a selected one of a number of mutually angularly-spaced mechanically scanned radio stations. Further, by providing suitable radio station coding, together with relay memory means, such relay may effect a data link between any selected pair of any number of radio stations commonly within sight of such relay, without additional relay transmitting and receiving equipment. In other words, such data link demonstrates multiple access features without an associated multiplication of relay transmitters and receivers. Also, because such relay employs a directional planar array (rather than a lineal array), increased gain is achieved in such data link whereby less power and smaller apertures may be employed. Moreover, because a unique carrier frequency is employed for communication between a planar antenna array of the relay and each station, a unique pair of mutually exclusive frequencies is employed for data-link purposes between a pair of stations via such relay, and corresponding to two associated lines-of-sight from such relay, as to more readily assure the security of such data-link from spurious use and jamming.

Accordingly, it is a broad object of the subject invention to provide an improved radio data link system.

It is another object of the invention to provide a radio data link system including a radio relay element having multiple access features without an associated multiplication of transmitting and receiving equipment.

It is still another object of the invention to provide a radio data link system providing maximum security of transmission and reception.

It is a further object of the invention to provide a secure radio data link system allowing convenient communication access between any two terminal stations of the data link system.

It is yet another object of the invention to provide a high-gain secure data link system allowing reduction in transmission power, receiver sensitivity and antenna apertures.

These and other objects of the invention will become apparent from the following description, taken together with the accompanying drawings in which.

In the figures, like reference characters refer to like parts.

Figure 1:
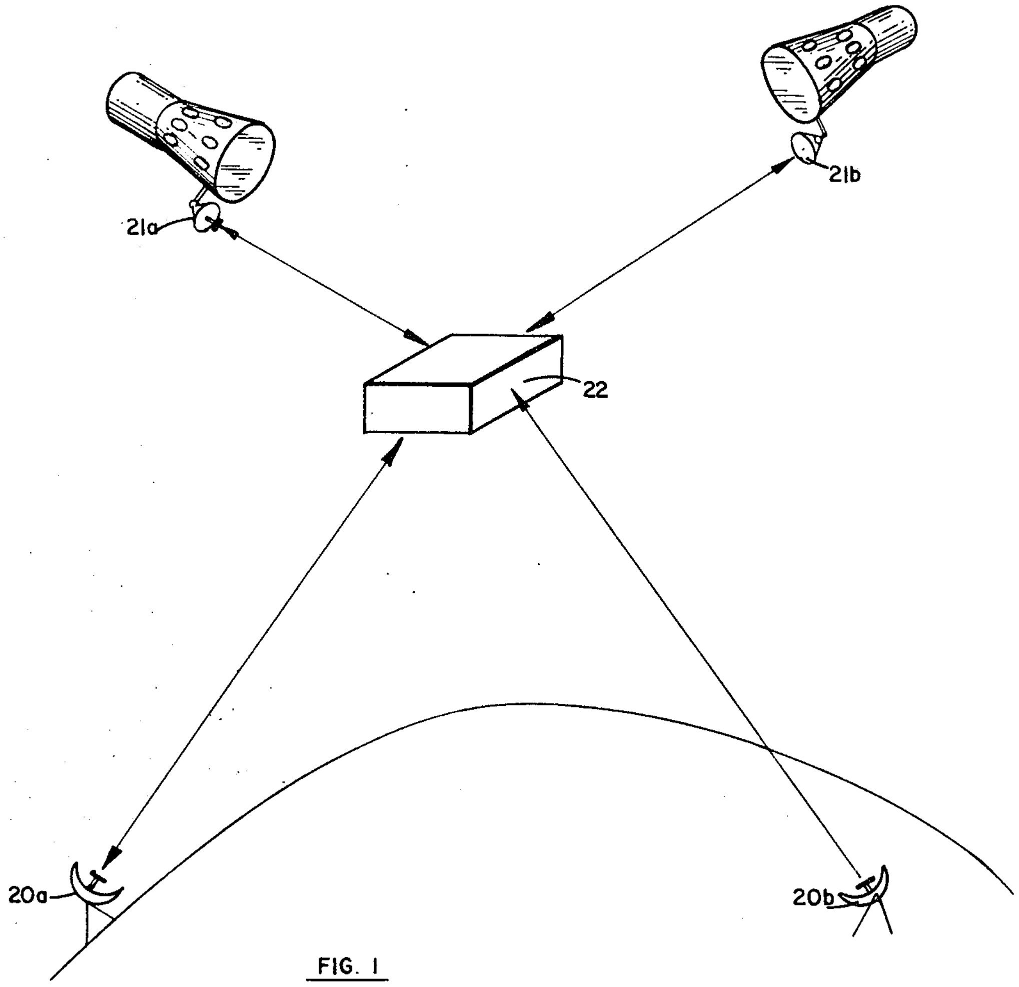
FIG. 1 is an isometric view of a satellite communication system to which the inventive concept may be advantageously applied.

Referring now to FIG. 1, there is illustrated a satellite communication system to which the inventive concept may be advantageously applied. There is provided a point-to-point communication system comprising one or more terrestrial radio stations **20*a* and 20*b*, one or more space borne radio stations 21*a* and 21*b* and at least one satellite radio relay 22. Each of stations 20, 21 and 22 comprise selectible frequency, directional transmitting and receiving systems. Each of stations 20 and 21 employ a mechanically scannable or steerable directional antenna; while relay 22** employs a plurality of planar, frequency-sensitive (electronically scanned doubly-dispersive) arrays, arranged in a six-sided arrangement, whereby a selected direction of directivity may be achieved by the selection of an appropriate combination of carrier frequency and one of the planar arrays. Conceptually, communication may be established between any pair of stations by way of the relay. The relay employs that frequency sensitive planar array and carrier frequency corresponding to a line of sight between the relay and a station of interest. The station of interest must employ a like carrier frequency for transmitting to the relay, because the directional sensitivity of the relay will respond to signals from such direction which are of only that frequency (herein referred to as a direction frequency). In this way, the problems incident with the physical alignment of two mechanically steerable directional antennas are avoided.

(It is to be readily appreciated that both of a station and relay cannot conveniently employ a frequency scanned antenna without maintaining such station and relay in a carefully preselected orientation, because the line of sight between the two antennas will not, in general, represent a common direction frequency for both antennas, whereby a high-gain data link may be effected between them.)

The radio station may employ a directional tracking loop to steer its antenna toward the relay. By either the relay or station employing a scanned frequency or frequency program of sequentially selected frequencies in an acquisition or search mode of operation, the other may detect and employ the received one of such frequencies for transmission to the first. Because the rate at which such frequency search mode may be conducted, relative to the speed of a concomitant steerable antenna search mode, sufficient samples of the appropriate frequency can be received for identification and frequency and/or direction tracking.

Upon the mutual detection, location and identification of a station and relay, between which intermediate communication is sought, a data-link mode may be employed by which an information coded carrier is transmitted from a transmitting station at the proper direction frequency toward the relay. The relay, in turn, may transmit the information from a proper array and at a proper frequency to an intended or ultimate receiving station.

Where it is desired to communicate between two widely-spaced stations (commonly within line of sight of the relay) by means of the relay, it is necessary for each station to similarly enter the communication net by the above-described detection, location and identification process. By maintaining an up-dated record of the direction-frequency (and array) associated with receipt of a given transmitted code (corresponding to a given transmitting station), the relay is enabled to contact any of such members of the net. Communication between any two stations in the net may be effected by a transmitting one (of the two stations) by means of the correct (previously determined) direction, or carrier, frequency, corresponding to the direction of the transmitting station from the relay. The transmitting station may employ a series of codes or modulation forms, comprising at least a preselected addressee code identifying the intended receiving station followed by the message or intelligence to be transmitted. The relay responds to the addressee code by transmitting the corresponding direction-frequency as a relay carrier, and by impressing upon the relay carrier the intelligence or modulation envelope being received from the transmitting station. In this way, one station may "ring through" to another by means of telephone ring-through techniques, without having to know the location of the other, The terminal radio stations 20 and 21 of the above described communication system may be either mobile or fixed in location, and may be equipped with direction-frequency programming logic and the usual communication equipment (printers, senders, tape-reader, multiplex video, etc.) in addition to a high-gain steerable antenna, transmitter and receiver, as shown more particularly in FIG. 2, although an omnidirectional antenna may be employed in the airborne station if preferred. The relays 22 are equipped with direction-frequency programming logic and radio relay equipment, in addition to electronic scanning antenna arrays, as shown more particularly in FIG. 3.

Figure 2:
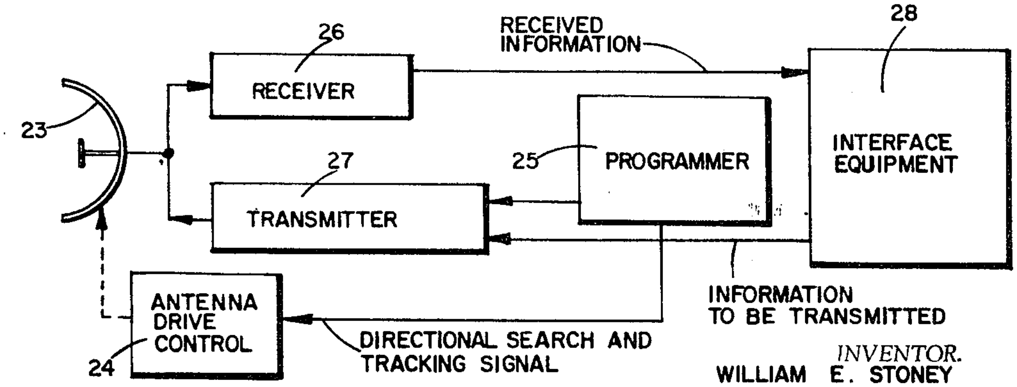
FIG. 2 is a block diagram of a terminal subsystem in the data link system of the invention.

Referring now to FIG. 2, there is illustrated in block diagram form an exemplary embodiment of a terminal subsystem of the system of FIG. 1. There is provided a high-gain mechanically steerable antenna 23 adapted to point in the directions of all relays or other stations with which it is intended to communicate, and having a frequency bandwidth corresponding to that employed by the electronic scanning antennas of such relays. Antenna 23 is alternatively steered or scanned by an antenna control unit 24 in accordance with directions from a programmer 25. An electronically tunable receiver 26 is responsively coupled to antenna 23 and may provide antenna tracking angle error signals (for utilization by the programmer 25 in control of the antenna unit 24), in addition to providing communication video and frequency search signals received from a relay station. In an exemplary arrangement, antenna 23, antenna control means 24 and receiver 26 may be arranged to cooperate in the manner of a dual plane monopulse angle tracking receiver, the construction and arrangement of which are well understood in the art, being described for example, in U.S. Patent 3,177,484, issued Apr. 6, 1965 to R. O. Case et al. for a Position Indicating System. Accordingly, elements 23, 24 and 26 are shown in block form only for convenience in exposition. Alternatively, a separate angle tracking receiver may be provided for cooperation with antenna 23 and antenna drive control means 24. Also, such angle tracking function need not rely upon a monopulse type receiver, but may employ conical scanning techniques, as is well understood in the art.

Selective frequency tuning of receiver 26 is provided by programmer 25, to be described more fully hereinafter.

A radio transmitter 27, comprising a wide band RF power amplifier, couples RF signals from programmer 25 to a feed of antenna 23, which RF signals include the information coding or modulation representing the intelligence to be transmitted. The construction and arrangement of such RF amplifier stages is well understood in the art, and transmitter 27 is therefore shown in block form only.

An interface unit 28 is provided to functionally integrate the message sending and receiving instruments (not shown) with the radio station itself. Interface unit 28 serves as a buffer unit to provide impedance isolation, signal format conversion, as required, between the message-sending and receiving instruments and programmer 25. Because such unit does not relate to a novel aspect of the inventive concept, such element is not further described herein.

Programmer 25, while coupling the radio receiver signals to interface unit 28 and coupling the messages to be transmitted to transmitter 27, provides a number of control functions. Basically, programmer 25 provides two general control modes for the station: a search or acquisition mode in which antenna control unit 24 is caused to scan antenna 23 in a search pattern directed toward a desired relay, while providing a frequency program of radio frequencies to be sequentially transmitted by transmitter 27 in each of the directions scanned by antenna 23.

Such transmitted search mode signals may be coded to identify the relay sought and/or the terminal station with which communication is ultimately sought. In this way (if desired), a relay incidentally interrogated by the coincidence of a suitable radio frequency corresponding to the direction-frequency association with the direction of the interrogating station, may utilize such code to prevent responding to such received frequency. Such non-response may be desired where the code is not indicative of either such relay or a terminal station included in a data-link comprising such relay.

Figure 3:
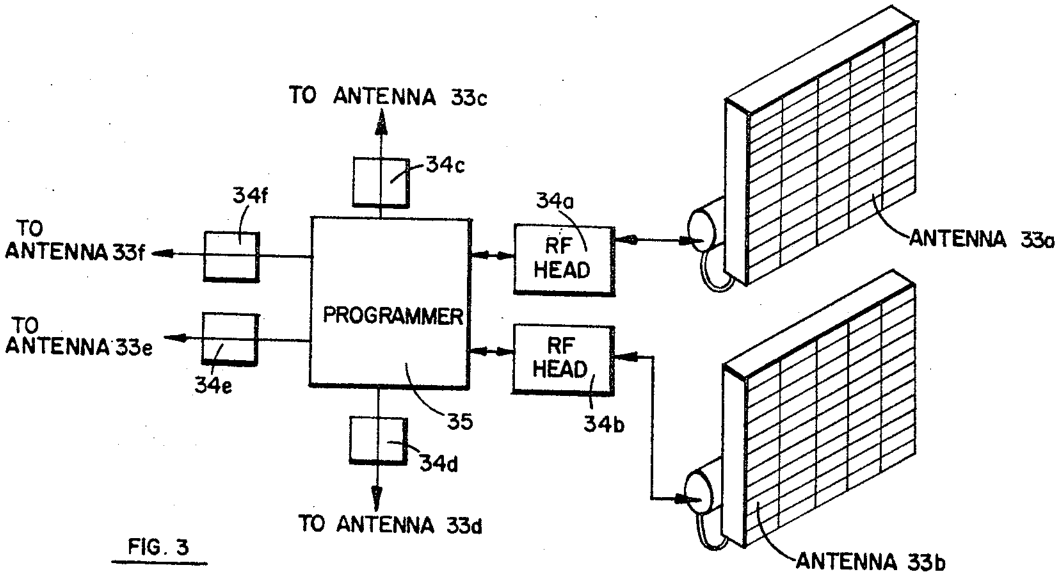
FIG. 3 is a block diagram of a radio relay subsystem in the data link of the invention.

In the case of a relay responding to that one of the scanned frequencies corresponding to the direction-frequency of the interrogating station, by transmitting a like frequency in return (coded to identify such relay), programmer 25 will then function to provide a track mode in which the station transmitter 27 and receiver 26 will employ a fixed RF frequency corresponding to the relay direction-frequency, and the antenna control unit will employ the angle-tracking error signals from receiver 26 to cause antenna 23 to track the relay, shown more particularly in FIG. 3.

Referring to FIG. 3, there is illustrated a schematic arrangement, partially in block form of relay 22 of FIG. 1. There is provided at least one planar array 33 of radiators arranged to cooperate as a low (direction versus frequency) dispersive structure in one plane (perpendicular to the array) and a high (direction versus frequency) dispersive structure in a plane mutually orthogonal to both the first plane and the planar array, whereby such electronically scannable array comprises a directional antenna which radiates in a unique direction for each one of the frequencies comprising the frequency bandwidth of such device. The construction and arrangement of a dual plane, double dispersive, electronically scanned antenna such as array 33 is understood in the art, an exemplary arrangement being described, for example, in copending U.S. application Ser. No. 409,912, filed Nov. 9, 1964, now Patent No. 3,355,738, by Jerry A. Algeo, assigner to North American Aviation, Inc., assignee of the subject invention.

Figure 4:
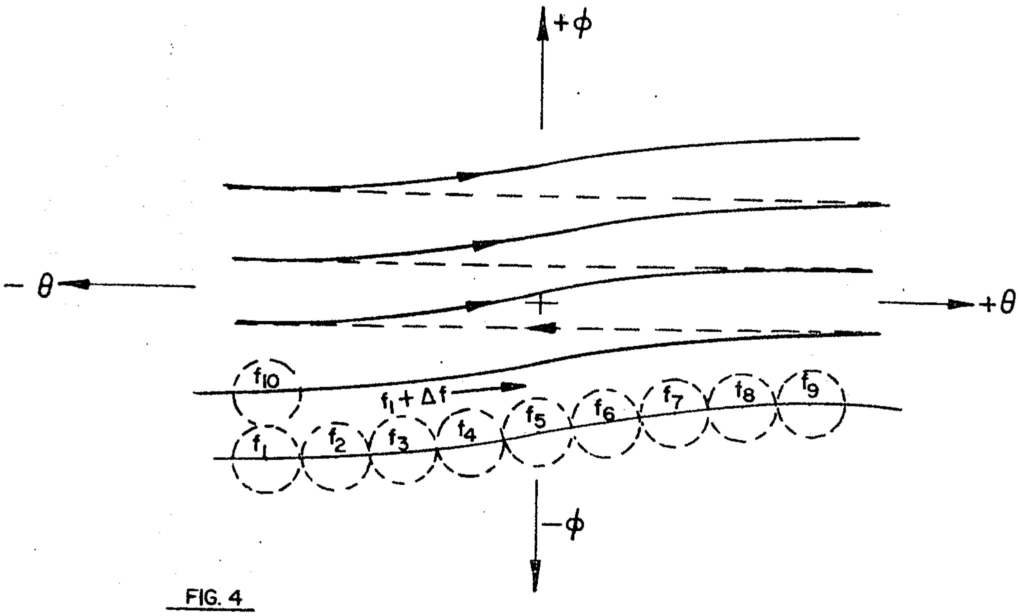
FIG. 4 is a diagram of an exemplary dual planar scanning pattern of an electronically-scanned planar array of radiating elements, said array having mutually orthogonal high and low dispersive properties.

In normal operation of such an array, when used in a transmitter mode, a continuous change of transmitter frequency causes the antenna beam pattern to continuously scan in both azimuth and elevation, as shown in FIG. 4. Discrete changes in frequency will cause the direction of the antenna beam to change by predictable angles. In the illustrated exemplary response of FIG. 4, the azimuth direction represents a high-dispersive response plane (larger changes in direction for a given change in frequency), while the elevation direction represents an associated low dispersive response plane (lesser changes in direction for a given change in frequency). For example, let a frequency $f_1$ correspond to a downward and leftward pointing extreme beam position and a successive increase of frequency in nine increments to, say, $f_9$ correspond to a downward and rightward extreme beam position. In other words, such change in frequency causes the beam to move from one extreme to the other in azimuth, without appreciable change in elevation. An additional increment in frequency to $f_{10}$ will result in the beam position being shifted back to the extreme left position in azimuth, with an associated incremental shift in elevation. Hence, it is clear that an incremental change in frequency, corresponding to at least that minimum change required for the extreme motion of the beam in the high dispersive direction ($\Delta f = f_{10} - f_1$), is necessary to effect a least change in direction in the low-dispersive plane. In other words, for a given (high dispersive) azimuth direction, changes in elevation may be effected without substantial associated changes in azimuth by changing the frequency in discrete steps equal to such minimum increment, $\Delta f$, while a change in azimuth may be effected without a substantial change in elevation (low dispersive) direction, by employing frequency changes less than such increment.

As indicated in the description of FIG. 1, spherical coverage of an electronically scanned antenna may be obtained, if desired, by employing (in the arrangement of FIG. 3) six planar arrays 33a, 33b, 33c, 33d, 33e and 33*f* forming the six sides of a box-like structure, an appropriate combination of a particular array and direction-frequency being selected to effect communication in a selected direction. Such box-like structure would also house the remaining equipment of the relay system. Also, solar power units may be interlaced between the radiation elements of each array, if desired, to provide a source of electric power for necessary excitation of such equipment.

There is also provided in the arrangement of FIG. 3, an RF head 34 associated with each of the arrays 33*a*, *b*, *c*, *d*, *e* and *f*, and comprising a transmitter or RF amplifier similar to that of FIG. 2 for amplifying and transmitting those coded frequencies provided by a programmer 35. Each RF head further includes a receiver or low-noise, wide band, amplifying means responsive to the bandwidth of an associated one of planar arrays 33.

Programmer 35 (in FIG. 3) comprises logic control and memory means for controlling the transmitter of an appropriate RF head 34. Programmer 35 receives and decodes incoming signals of all frequencies within the antenna bandwidth, the frequency of a received signal (and the identity of the receiving array) indicating the direction angle of the interrogating or transmitting station. This information may be stored by the relay programmer 35. The coding or message heading of the received signal will indicate the ultimate addressee. In those applications where the addressor (or interrogating station) can determine the relay direction to the addressee, the original signal from the addressor may be made to include a sub-multiple modulation frequency, which can be separated (in the receiving relay) and multiplied up to the proper direction frequency, allowing a simplification of the arrangement of the relay programmer 35.

Hence, where the relay programmer 35 of FIGURE 3 has received and stored the direction frequency associated with a given station code for each of a plurality of tracking stations, any addressor among such stations may ring through to another of such stations by merely addressing the relay with the desired addressee's code and without having to know the location of the addresse's station. Further, because a unique direction frequency is employed for each direction or station, different stations may address other stations through the relay concomitantly and on a noninterference basis.

Although the angle-tracking function of the terminal stations has been described in terms of tracking the direction frequency signals from the relay, the concept of the invention is not so limited. Alternatively, the relay may include an omnidirectional narrow-band tracking beacon for cooperation with the angle-tracking receivers of the terminal stations, and employing a preselected beacon frequency and a preselected modulation code identifying the relay. Such beacon would require little power because of its narrow bandwidth, and would allow additional simplification in the programmers.

Because of the limited bandwidth lawfully available for communication purposes, together with the difficulty of designing wideband equipment having desirable gain and signal-to-noise performance, a technique may be employed for limiting the requisite system bandwidth without decreasing the system gain (i.e., without increasing the relay beamwidth), which technique is referred to as scan-band doubling. Such technique relates to the design of the relay frequency-scanned arrays, and involves increasing the spacing between adjacent radiating elements of the frequency scanned antenna arrangement described and illustrated in the above noted copending patent application Ser. No. 472,236, filed July 15, 1965 by Algeo. Such arrangement of Algeo includes the use of adjacent, half-wave spaced, oppositely-phased radiating elements, alternate line sources of such elements being fed with separate but interleaved helices, the outputs of which helices are connected in circuit to a monopulse bridge or microwave hybrid.

Use of the difference port, rather than the sum port of the hybrid for excitation of the two helices provides a $\pi$ or 180 phase shift between the two helices, as is well understood in the art, thereby altering a broadside beam pattern to an off-broadside (or even an end-fire) pattern.

By increasing the line source inter-element spacing from $\lambda_{min}/2$ to, say, $3\lambda_{min}$, the number of main beams is increased, and the associated angular spacing between adjacent main beams produced by alternative excitation of the sum and difference ports of the hybrid, may be substantially decreased from, say, 90°. In other words, within a given cone or solid angle of interest (corresponding, for example, to the view angle occupied by the earth as seen from a satellite relay) a selected one of a mutually-spaced sum channel main beam and difference beam may be made to exist. The angle-off-broadside of the difference channel ($\pi$-phase shifted) beam closest to the on-broadside condition of the sum channel beam closest to the on-broadside condition of the sum channel beam defines the useful limits of such cone. Hence, by applying the scanning frequency alternatively to the sum and difference ports of the microwave hybrid, the cone of interest may be scanned with half that bandwidth required to scan it by excitation of only one of the sum and difference ports.

A preferred embodiment of the arrangement of FIGS. 2 and 3 employing a different data link transmit, or down, frequency than receive, or up, frequency permits simultaneous data transmission and reception by each radio station in the communication net, together with a host of other advantages, as will be more fully explained hereinafter. Such an embodiment of the system arrangements of FIGS. 2 and 3, in which a separate transmitting and receiving arrays are employed by the relay station, is shown in FIG. 5.

Figure 5:
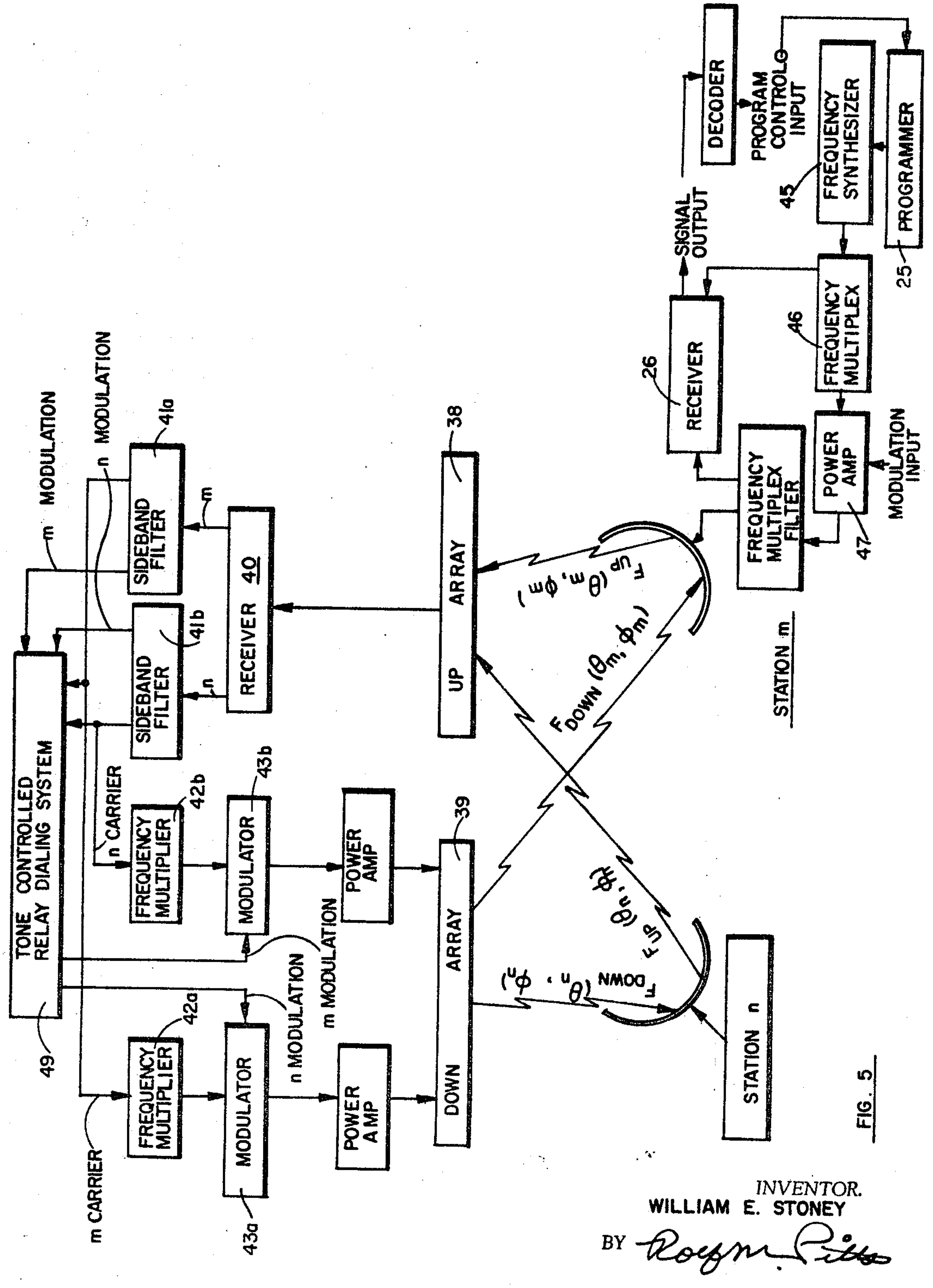
FIG. 5 is a system block diagram of a preferred embodiment of the inventive concept.

Referring now to FIG. 5, there is illustrated in block diagram form a preferred embodiment of a radio energy link having a directional relay for concomitant communication with a plurality of radio stations within line of sight of the relay and at different directions therefrom. The relay station includes an antenna having a receiving first and transmitting second array 38 and 39, said arrays being similarly oriented, double-dispersive, frequency-scanned arrays having a substantially similar bandwidth, the direction frequencies of the transmitting array differing slightly from those of the receiving array by preselected frequency differences. In this way, transmission and reception along a given line of sight may be effected simultaneously on a non-interference basis, as will be made more clearly evident hereinafter.

There is further provided a receiver 40 responsively coupled to the receiving, or up, array 38 and a plurality of sideband filters 41, each filter responsively coupled to receiver 40 and responsive to a mutually exclusive received carrier frequency lying within the bandwith of the receiver 40 and receiving array 38, for recovering a modulation envelope contained in a carrier signal received from a direction corresponding to the received carrier frequency (i.e., up direction frequency). Such modulation envelope includes two separate modulations: one corresponding to a preselected submultiple of the corresponding down direction frequency of the second or transmitting array; and the other including the intelligence bandwidth to be transmitted. The appearance of these two separate modulations is indicated as the two outputs of each of the sideband filters 41.

There is further provided, in the relay arrangement of FIG. 5, a plurality of radio frequency means 42 operatively coupled to the second array 39, each of the radio frequency means 42 generating a mutually exclusive downcarrier frequency for transmission by second array 39 in a direction corresponding to a mutually exclusive one of the directions to which the side band filters 41 respond.

A like plurality of modulation means 43 as radio frequency means 42 is provided, each of modulation means 43 being arranged to modulate the output of a mutually exclusive one of the radio frequency means 42, a modulation input of each of the modulation means 43 being adapted to be responsive to a message output of a selected one of the sideband filters 41. In this way, the modulation envelopes, corresponding to messages transmitted on a plurality of concomitantly-received up-direction carrier frequencies, may each be concomitantly relayed or retransmitted in selected directions corresponding to the direction of an intended addressee terminal station.

Each of the radio frequency means 42 of FIG. 5 is shown as comprising frequency multiplier means for multiplying the submultiple down-carrier output of an associated sideband filter up to the preselected down-carrier radio frequency. Alternatively, such radio frequency means could comprise a switchable RF source, switched in response to the output of a correspondending sideband filter (employed as a source of a switching control signal).

The construction and arrangement of sideband filters 41 and frequency multipliers 42 are well understood in the art, and therefore these elements are shown in block form only for convenience in exposition.

Each of the radio stations of FIG. 5, between which communication is to be effected by means of the illustrated radio relay, includes a frequency synthesizer 45 or other programmable means (programmed by programmer 25) for generating selected ones of a plurality of discrete freuqencies, which may be suitably combined and multiplied by frequency multiplexing means 46 to provide a selected carrier frequency which may be frequency modulated, the carrier frequency being an up-direction frequency for reception by the relay, the frequency modulation being a submultiple of an associated down carrier to be employed in the illustrated embodiment of the relay of FIG. 5. The construction and arrangement of a programmer, frequency synthesizer and frequency multiplexer, employing known components such as diode matrices, crystal oscillators, mixers and filters, is well understood in the art, as indicated for example in U.S. Patent No. 3,046,547, issued July 24, 1962 to N. A. Begovich for Two Pulse MTI Radar System; U.S. Patent 3,249,887, issued May 3, 1966 to H. A. Robinson for Frequency Synthesizer, and in U.S. patent application Ser. No. 450,380, now Patent No. 3,295,128, filed Apr. 23, 1965 by J. A. Canaday, et al., assignors to North American Aviation, Inc., assignee of the subject invention. By means of such arrangement a frequency-scanned carrier may be generated, programmer 25 also including a control input for selectively stopping the scanning program at a currently generated carrier frequency, as will be more fully explained hereinafter.

A power amplifier-modulator 47 may be employed to both amplify the output of multiplexer 46 to a suitable power level for transmission purposes and also to provide modulation of such output in accordance with intelligence to be transmitted. Such intelligence may include, for example, a first selected one of a preselected plurality of codes identifying the relay station to which access is desired, and a second preselected code identifying the transmitting station. Upon gaining acquisition to that communication net comprising the relay addressed, additional intelligence to be transmitted may include a selected addressee code identifying the station intended to be addressed, followed by the message to be transmitted.

The receiver 26 of a radio station may include an intermediate frequency stage employing a local oscillator input, as is well understood in the art. Such local oscillator input may be provided by the frequency multiplexer in addition to the other frequencies generated thereby. Such local oscillator input will be a radio frequency differing from that down carrier frequency associated with the generated up-frequency by a frequency difference corresponding to the preselected center frequency of the intermediate frequency receiver stage. Such local oscillator frequency may be conveniently generated, for example, by multiplying the synthesized submultiple down carrier frequency with a multiplier (similar to multipliers 42 in the relay) and then mixing such multiplied frequency with the output of a STALO the frequency of which corresponds to the preselected intermediate center frequency of the receiver IF stage. In other words, receiver 26 is arranged to be responsive to a received down carrier frequency corresponding to an up direction frequency generated by the programmable frequency means.

In normal operation of the arrangement of FIG. 5, two operational modes are provided, as in the description of the general arrangements of FIGS. 2 and 3. In the first or acquisition mode, the station programmer 25 of any station, or of each of a number of stations (which are angularly tracking the relay with steerable directional antennas), transmits a search program of successive up-frequencies for reception by the first or receiving array 38 of the relay of FIG. 4, each up-frequency modulated with a preselected submultiple of the associated down direction frequency of second or transmitting array 39.

Upon receipt by relay receiver 30 of an up or direction frequency, corresponding to the direction of the transmitting station and having a signal level above a preselected threshold, a corresponding one of relay sideband filters 41 responds to such carrier by stripping off the submultiple down carrier modulation, which is then multiplied up to the desired down direction frequency by an associated multiplier 42 for transmission by second array 39 in the direction of the originating station. Upon receipt of the down direction frequency thus corresponding to the correct up direction frequency, station receiver 26 provides a signal output which may be employed as a program control input to programmer 25, thereby halting the frequency-scanning of the up frequency at that currently generated carrier frequency corresponding to the correct up direction frequency. Hence, a data link is now established between the relay and the station, the tracking station sending the correct up direction frequency to the relay and the relay responding by sending the correct down direction frequency to the tracking station. For example, the up carrier of station *m* in FIG. 5 is received by the relay sideband filter 41*a*, which removes the down *m* carrier submultiple, which is multiplied by multiplier 42*a* and transmitted back to station *m* by down-array 39.

Although only a pair of sets of a sideband filter, frequency multiplier and modulator, have been shown in the arrangement of the relay in FIG. 5, for cooperation with stations in only two directions, it is clearly understood that the concept of the relay is not so limited, and that a set may be employed for each useful discrete direction of interest.

A change of relative position or attitude of the relay may cause a change in the required up and associated down-direction frequencies as indicated by either the down-carrier not being directed at the station by second relay array 39 or by the up carrier signal (received at first array 38) falling below the relay receiver threshold (in which latter case, no down carrier signal is transmitted). In the event of the absence of a received down carrier output from station receiver 26, the hold-control input to programmer 25 would be removed, in which case the programmer would resume the frequency-scanning state, with acquisition or frequency-lock-on subsequently being effected at a new direction frequency.

In the acquisition mode of the cooperation of a given station with the relay of FIG. 5, a second function is performed, in addition to performing the frequency lock-on at the appropriate (up and down) direction frequency. This second function involves setting up, or updating, a ring-through or dialing register 49, in which the down direction frequency associated with the lock-on station is identified. In this way, when a second station (locked-onto the relay) subsequently seeks to address the first station via the relay in the manner of conventional telephone-art ring-through techniques the addressed code or call-number of the first station may be used to impose the addressor's "message" or modulation intelligence upon the proper relay down-frequency carrier, corresponding to the direction of the addressee. Such code may be of any form employed in the art, although a tone code may be assumed, in which preselected combinations of audio frequencies in a preselected sequence may be employed, as is well understood in the telephone switching art.

Figure 6:
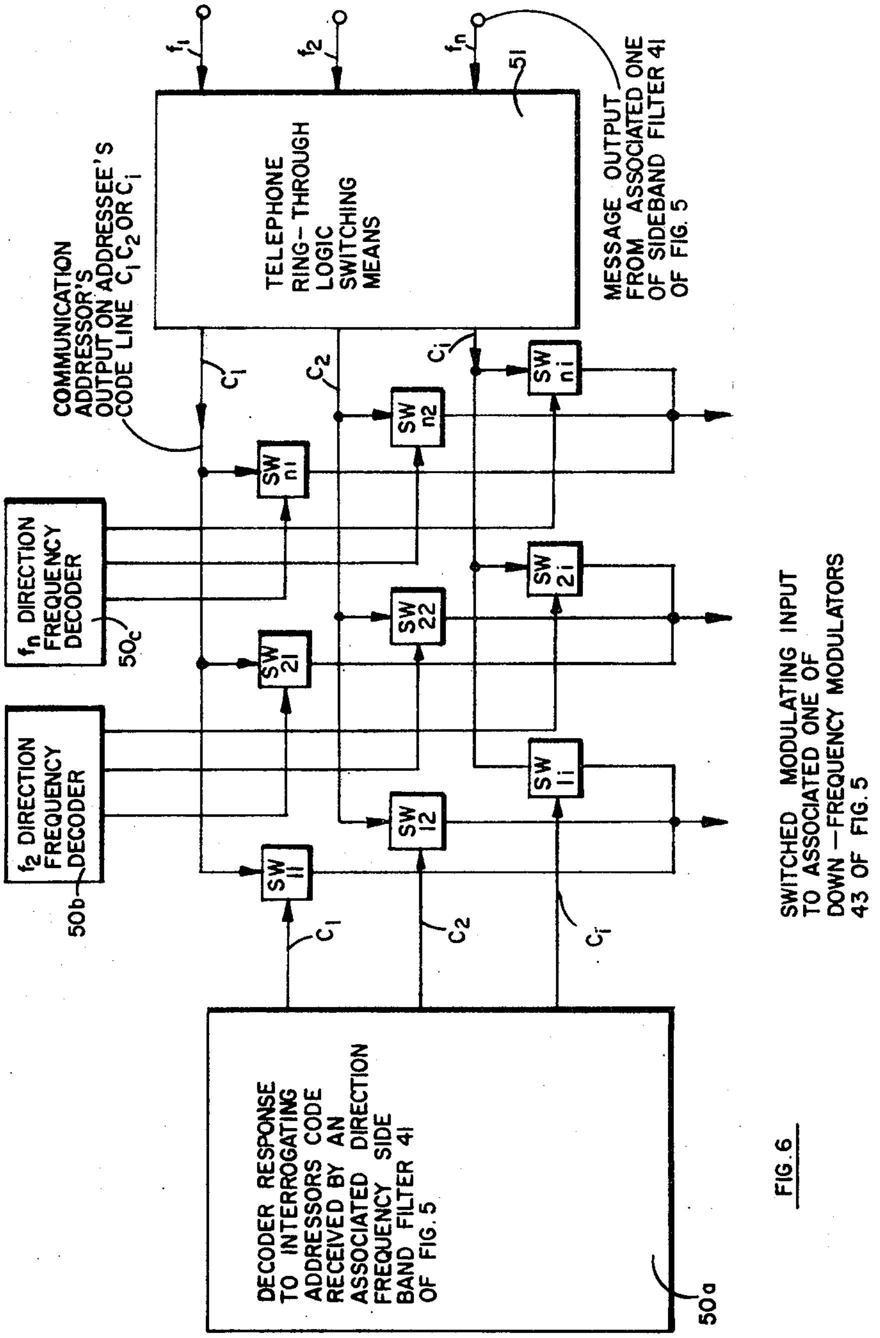
FIG. 6 is a schematic arrangement, partially in block form, of the ring-through register for the relay of FIG. 5.

The details of the construction and arrangement of a coded switching register 49 does not necessarily form an aspect of the inventive concept, although a schematic arrangement of a portion thereof in terms of a multiple crossbar switching function is provided in FIG. 6, for better illustrating the cooperation of the invention with register 49 of FIG. 5.

Referring to FIG. 6, there is illustrated an exemplary schematic arrangement of a portion of the dialing register 49 of FIG. 5. There is provided a multiple cross bar switching arrangement in cooperation with a plurality of direction frequency decoders 50 and telephone-type ring-through logic switching means 51. Each of decoders 50 may be arranged to be responsive to a received two-part code, received by an associated one of the side band filters 41 (of FIG. 5) from an interrogating addressor in the acquisition mode. Such two-part code may be indicative of the relay sought to be addressed and of the identity of the interrogating addressor station. Each decoder 50 has a plurality of output lines, each output line corresponding to a mutually exclusive one of a plurality of preselected station codes.

The multiple crossbar switching arrangement comprises a planar switching matrix, each of the columns of such matrix corresponding to an associated one of the direction frequency decoders 50, and each row of such matrix corresponding to a mutually exclusive one of the preselected number of station codes. A control input of each switch in each column is responsively connected to a corresponding output of the decoder associated with such column. The signal inputs of the switches of a given row are commonly adapted to be connected to a given station code, or addressee, signalling line of telephone switching means 51; and the outputs of a given column of switches are commonly adapted for connection to a direction frequency modulator 43 (in FIG. 5) associated with the direction frequency represented by such column. In other words, each switch represents a unique combination of direction frequency and station code.

Although such exemplary arrangement is illustrative of a square matrix of only three elements in each array, it is to be understood that the concept extends to a matrix of any dimension.

During the acquistion mode of a given station, the occurrence of the corresponding station code at the output of a given direction frequency decoder closes that one of the register switches (of FIG. 6) corresponding to the coincident combination of direction frequency and station code, thereby providing a registry of such combination of direction frequency and station code, for use by ring-through switching means 51. For example, if an interrogating station (transmitting an identifying code $C_2$) is received on the $f_n$ direction frequency, the corresponding $f_n$ decoder closes the associated $C_2$ switch, $SW_{n2}$.

The telephone-type ring-through logic switching means 51 (in FIG. 6) has a plurality of input lines, each connected to the modulation output of an associated one of the relay sideband filters 41 (of FIG. 5). Logic switching means 51 also has a plurality of message output lines, each corresponding to a mutually exclusive one of a preselected plurality of addressee codes. Upon the application of a ring-through signal indicative of one of the preselected addressee codes $C_n$, applied to one of the inputs to switching means 51 from an associated one of the sideband filters 41 of FIG. 5, switching means 51 internally interconnects such input line and that one of the addressee output lines corresponding to the applied addressee code, as is well understood in the telephone switching art. For example, a received signal received on input line $f_1$ (corresponding to a direction frequency $f_1$) and containing a ring-through signal, or dialing code $C_2$, would result in lines $f_1$ and $C_2$ being interconnected.

The message on line $C_2$ is then transmitted to the appropriate one of down frequency modulators 43 (of FIG. 5) by means of the corresponding switch of the cross-bar switching function. In accordance with the previous example, where the down-direction frequency $f_n$ corresponds to the direction of that addressee station having the addressee code $C_2$, the message on output line $C_2$ (of ring-through means 51) is translated to the $f_n$ direction frequency modulator by that switch $SW_{n2}$ corresponding to the $f_n$ column and $C_2$ row in the switching matrix of FIG. 6.

Accordingly, it is understood that the cooperation of a station receiver 26 with the dual array relay arrangement of FIG. 5 allows both initial acquisition and reacquisition of the communication net by the tracking station in the event of a loss of, or change in, direction frequency, with up-dating of the relay register 49 upon reacquisition, as well as providing simultaneous ring-through capability for each of several stations to a mutually exclusive one of a plurality of other members of the communication net.

It may not be desirable or convenient to effect such a reacquisition in order to maintain direction-frequency lock-on, in view of the station-to-station communication interruption suffered during the interval of such reacquisition. Accordingly, it may be desirable to include in each station programmer 25 frequency tracking means for tracking changes in the required direction frequency, without the necessity of occasioning a frequency-scan interval for reacquisition. Such frequency tracking means may comprise, for example, a sub-program (in programmer 25) for periodically generating sampling frequencies indicative of adjacent directions, and logic means responsive to receiver 26 for indicating that change in direction frequency associated with an increased receiver response and, therefore, indicative of a desired change in direction frequency. Where the beamwidths associated with the discrete direction frequencies, utilized for adjacent direction angles, tend to overlap, such sampling or frequency-lobing procedure allows the performance of a frequency tracking function with only a gain variation in, rather than interruption of, station-to-station communication. In other words, such style of direction frequency tracking is functionally analogous to conical-scan target angle tracking.

Figure 7:
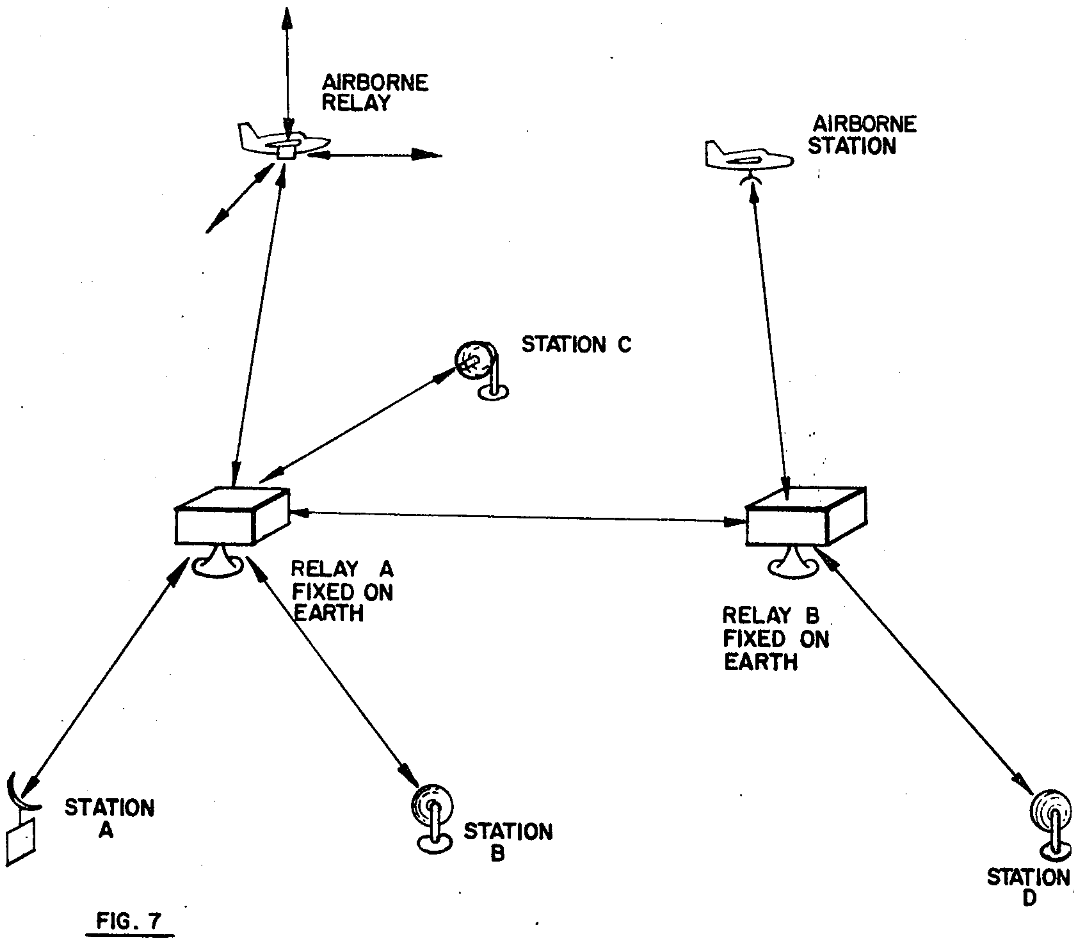
FIG. 7 is a diagramatic representation of a ground relay communication net.

Although the concept of the invention has been described in terms of one application as a satellite radio relay, it is clear that the concept of the invention is not so limited. The relay of the invention is equally adapted for use on the ground as a stationary or fixed relay in a communication network, or may even be mobile or deployable. In a ground-type installation of the relay, several relays may be made to cooperate by maintaining a mutual orientation thereof, whereby like direction frequencies of each correspond to the common direction line or line of sight between a pair of relays, as shown in FIG. 7. In this way communication may be effected between two relays, and the terminal stations of one net may obtain access to those of another net.

Also, although the concept of the invention as applied to a satellite has been described in terms of a communication network relay, the concept of the invention is not so limited. The antenna arrays of a satellite relay may be employed to provide a direct measurement of the satellite's attitude with respect to a selected terminal station, and such measurement utilized to provide control signals for operation of the satellite's attitude controllers. Either monopulse receiving arrays (as described in the above mentioned copending U.S. application Ser. No. 472,236, filed by Algeo) or sequential frequency lobing (described above as analogous to conical scanning) may be employed to effect such attitude control to within a small fraction of the beamwidth of the satellite antenna array, the ultimate bandwidth of this control loop being limited only by the two-way transmission delay between the controlling station and the satellite.

Such control function may be sought by a control station on earth with which a continuous data link is to be maintained for performing billing operations in connection with relay switching services performed. Also, where advantageous, certain relay programmer functions may be performed by equipment at such control station, thereby reducing the amount of equipment necessary aboard the satellite.

Accordingly, it is to be appreciated that a directional radio relay system has been described which provides high-gain directional point-to-point radio communication between widely separated radio stations. Such high-gain is achieved by means of a double-dispersive frequency-scanned antenna at the relay. Because a unique direction frequency is associated with each direction, a plurality of station pairs may communicate via the relay on a noninterference basis. Also, neither station of a communicating pair of stations need know the location of the other. Further, because of the combination of high-gain and unique direction frequency for a given direction relative to a given relay array, a high degree of security is afforded by such radio relay system (in addition to other security methods which may be utilized in conjunction therewith). Moreover, because of such high-gain (provided by the cooperation of directional up-transmission, directional relay reception and down-transmission, and directional reception), extremely low-power elements and miniaturized electronics may be accommodated in the relay design. Therefore, an improved radio relay system has been described.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A radio energy link comprising:
- a mechanically scannable directional first radio system, and
- a frequency sensitive directional second radio system, one of said first and second radio systems comprising means for selectively transmitting signals at a programmed sequence of carrier frequencies in a search mode, the other of said radio systems including means for transmitting, in response to a received one of said transmitted signals, a carrier frequency corresponding to the direction and frequency of said received signal, thereby establishing a data-link mode.

2. A radio energy data link comprising a first and relay second transmitting-receiving station,
- said first station comprising:
  - a mechanically scannable directional antenna,
  - a first receiver operatively coupled to said antenna,
  - a first programmable-frequency transmitter operatively coupled to said mechanically scannable antenna, and
  - first frequency programming means responsive to said receiver for programming the carrier frequency of said first transmitter to correspond with that of a received signal from said second station; and
- said relay second station comprising:
  - a frequency-scannable directional antenna,
  - a second receiver coupled to said frequency-scannable antenna,
  - a second programmable-frequency transmitter operatively coupled to said frequency scannable antenna, and
  - second frequency-programming means responsive to said receiver for programming the carrier frequency of said second transmitter to correspond to the direction of a received signal received by said frequency scannable antenna.

3. The device of claim 2 in which one of said first and second frequency programming means includes means for alternatively providing a frequency-scanning program.

4. The device of claim 2 in which said first station includes monopulse receiver angle-tracking means in cooperation with said mechanically scannable antenna for tracking a selected source of radio signals.

5. A radio energy data link comprising a first and second transmitting/receiving station,
- said first station comprising:
  - a mechanically scannable directional antenna,
  - a first receiver operatively coupled to said antenna, and
  - first frequency programming means responsive to said receiver for programming the carrier frequency of said transmitter to correspond with that of a received signal; and
- said second station comprising:
  - a frequency scannable directional antenna,
  - a second receiver coupled to said directional antenna,
  - a second programmable-frequency transmitter operatively coupled to said antenna, and
  - second frequency-programming means responsive to said receiver for programming the carrier frequency of said second transmitter to correspond to the direction and frequency of a received signal received by said frequency-scannable directional antenna.

6. In a radio energy data link, a directional radio relay for concomitant communication with a plurality of radio stations within line of sight of said relay and at different directions therefrom, and comprising:
- an antenna including at least one double-dispersive, frequency-scanned receiving array having a preselected bandwidth;
- a receiver continuously responsively coupled to said array; and
- a plurality of sideband means, each responsively coupled to said receiver, responsive to mutually exclusive carrier frequencies within the receiver bandwidth for recovering a modulation envelope contained in a carrier signal received from one of said radio stations along a direction corresponding to the carrier frequency of said carrier signal.

7. In a radio energy data link, a directional radio relay for concomitant communication with a plurality of radio stations within line of sight of said relay and at different directions therefrom, and comprising:
- an antenna including at least one double-dispersive, frequency-scanned receiving array having a preselected bandwidth and further including a transmitting second array having substantially the same bandwidth as said first array, the direction frequencies of each of said receiving and transmitting arrays for a corresponding direction differing by a preselected frequency difference;
- a receiver responsively coupled to said receiving array;
- a plurality of sideband filters each responsively coupled to said receiver and responsive to a mutually exclusive carrier frequency within the received bandwidth for recovering a modulation envelope contained in a carrier signal received from a direction corresponding to the carrier frequency of said carrier signal;
- a plurality of radio frequency means operatively coupled to said second array, each of said radio frequency means generating a mutually exclusively down carrier frequency for transmission in a direction corresponding to a mutually exclusive one of the directions to which the side band filters respond; and a plurality of modulation means, each of said modulation means arranged to modulate the output of a mutually exclusive one of said radio frequency means, a modulation input of said modulation means adapted to be responsive to an output of a selected one of said sideband filters, whereby the modulation envelopes on a plurality of concomitantly received carrier frequencies may each be concomitantly retransmitted in selected directions.

8. The device of claim 7 in which each of said radio frequency means is responsively coupled to an output of a corresponding one of said sideband filters, whereby a transmit direction frequency may be transmitted in a preselected direction in response to a received corresponding receive direction frequency.

9. The device of claim 7 in which a modulation output of each of said sideband filters is adapted to respond to a preselected modulation representing a submultiple of that transmit direction frequency of said second array corresponding to the received receive direction frequency of the first array to which said sideband filter responds, each of said radio frequency means comprising a radio frequency multiplier connected to a mutually exclusive one of said sideband filters for multiplying a received submultiple of a transmit direction frequency by the reciprocal of such submultiple.

10. In a radio energy data link having a directional radio relay for concomitant communication with a plurality of radio stations within line of sight of said relay and at different directions therefrom, transmission and reception in each direction by said relay being effected by respective mutually exclusive first and second frequencies, each of said radio stations comprising:

programmable means for generating a first radio frequency signal to be transmitted;

a receiver adapted to be responsive to a received second carrier frequency corresponding to said first radio frequency generated by said programmable means;

frequency modulation means for modulating said generated first frequency with a preselected submultiple of said corresponding second frequency; and programming means coupled to said receiver for selectively varying the generated first frequency of said radio frequency signal and maintaining a selected carrier frequency thereof in response to a respective absence and presence of a received second frequency corresponding to said first frequency.

References Cited

UNITED STATES PATENTS

| | | | |
|---|---|---|---|
| 3,119,998 | 1/1964 | Foley | 343—16 |
| 3,300,782 | 1/1967 | Margerum et al. | 343—100 |
| 3,316,552 | 4/1967 | Reid | 343—7.4 X |
| 3,331,071 | 7/1967 | Webb | 343—100 |

RICHARD A. FARLEY, *Primary Examiner.*

M. F. HUBLER, *Assistant Examiner.*

U.S. Cl. X.R.

325—4, 14